United States Patent
Chapman et al.

(10) Patent No.: US 8,401,938 B1
(45) Date of Patent: Mar. 19, 2013

(54) TRANSFERRING FUNDS BETWEEN PARTIES' FINANCIAL ACCOUNTS

(75) Inventors: Michael Aaron Chapman, Chicago, IL (US); Hyun Jin Ko, Evanston, IL (US); Rodney Hal Monson, Waukegan, IL (US); Mark Alexander Jones, Evanston, IL (US); Bryan L. Mackrell, Pittsburgh, PA (US); Michael Ley, Moon Township, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 906 days.

(21) Appl. No.: 12/152,073

(22) Filed: May 12, 2008

(51) Int. Cl.
*G07F 19/00* (2006.01)
*H04M 15/00* (2006.01)

(52) U.S. Cl. .................................................. 705/34

(58) Field of Classification Search .................. 705/34
See application file for complete search history.

(56) References Cited

U.S. PATENT DOCUMENTS

| | | | |
|---|---|---|---|
| 4,367,402 A | 1/1983 | Giraud et al. | |
| 4,443,027 A | 4/1984 | McNeely et al. | |
| 4,648,037 A | 3/1987 | Valentino | |
| 4,837,422 A | 6/1989 | Dethloff et al. | |
| 5,101,200 A | 3/1992 | Swett | |
| 5,500,513 A | 3/1996 | Langhans et al. | |
| 5,621,640 A | 4/1997 | Burke | |
| 5,649,118 A | 7/1997 | Carlisle et al. | |
| 5,845,260 A | 12/1998 | Nakano et al. | |
| 5,918,217 A | 6/1999 | Maggioncalda et al. | |
| 5,953,710 A | 9/1999 | Fleming | |
| 5,963,925 A | 10/1999 | Kolling et al. | |
| 5,991,749 A | 11/1999 | Morrill, Jr. | |
| 6,012,044 A | 1/2000 | Maggioncalda et al. | |
| 6,032,134 A | 2/2000 | Weissman | |
| 6,044,360 A | 3/2000 | Picciallo et al. | |
| 6,049,776 A | 4/2000 | Donnelly et al. | |
| 6,052,675 A | 4/2000 | Checchio | |
| 6,064,984 A | 5/2000 | Ferguson et al. | |
| 6,064,986 A | 5/2000 | Edelman | |
| 6,085,174 A | 7/2000 | Edelman | |

(Continued)

FOREIGN PATENT DOCUMENTS

| | | |
|---|---|---|
| WO | WO 96/34358 A1 | 10/1996 |
| WO | WO 03/030054 A1 | 4/2003 |

OTHER PUBLICATIONS

Phillip Robinson, Mastering Your Money, San Jose Mercury News, Oct. 9, 1994.*

(Continued)

*Primary Examiner* — Matthew S Gart
*Assistant Examiner* — Russell S Glass
(74) *Attorney, Agent, or Firm* — Buchanan Ingersoll & Rooney PC; Robert J. Pugh

(57) ABSTRACT

Computer-implemented methods for requesting a transfer of funds between a first party a second party: the methods may comprise receiving from the first party an instruction to initiate a transfer request and an electronic copy of a bill associated with the transfer request. The methods may also comprise receiving from the first party a text message associated with the transfer request and an indication of at least a second party who is a recipient of the transfer request. In addition, the methods may comprise posting the transfer request to an account of the second party. The transfer request may comprise the electronic copy of the bill associated with the transfer request, and the text message associated with the transfer request.

9 Claims, 6 Drawing Sheets

U.S. PATENT DOCUMENTS

| | | | |
|---|---|---|---|
| 6,088,682 A | 7/2000 | Burke | |
| 6,112,191 A | 8/2000 | Burke | |
| 6,128,603 A | 10/2000 | Dent et al. | |
| 6,173,269 B1 | 1/2001 | Solokl et al. | |
| 6,332,154 B2 | 12/2001 | Beck et al. | |
| 6,353,811 B1 | 3/2002 | Weissman | |
| 6,401,079 B1 | 6/2002 | Kahn et al. | |
| 6,411,938 B1 | 6/2002 | Gates et al. | |
| 6,473,794 B1 | 10/2002 | Guheen et al. | |
| 6,493,685 B1 | 12/2002 | Ensel et al. | |
| 6,519,571 B1 | 2/2003 | Guheen et al. | |
| 6,601,233 B1 | 7/2003 | Underwood | |
| 6,633,878 B1 | 10/2003 | Underwood | |
| 6,636,242 B2 | 10/2003 | Bowman-Amuah | |
| 6,636,833 B1 | 10/2003 | Flitcroft et al. | |
| 6,684,190 B1 | 1/2004 | Powers et al. | |
| 6,718,314 B2 | 4/2004 | Chaum et al. | |
| 6,718,535 B1 | 4/2004 | Underwood | |
| 6,742,002 B2 | 5/2004 | Arrowood | |
| 6,742,704 B2 | 6/2004 | Fitzmaurice et al. | |
| 6,839,687 B1 | 1/2005 | Dent et al. | |
| 6,839,692 B2 | 1/2005 | Carrott et al. | |
| 6,876,971 B1 | 4/2005 | Burke | |
| 6,921,268 B2 | 7/2005 | Bruno et al. | |
| 6,993,510 B2 | 1/2006 | Guy et al. | |
| 7,024,390 B2 | 4/2006 | Mori et al. | |
| 7,031,939 B1 | 4/2006 | Gallagher et al. | |
| 7,039,440 B2 | 5/2006 | Rodriguez et al. | |
| 7,062,458 B2 | 6/2006 | Maggioncalda et al. | |
| 7,076,465 B1 | 7/2006 | Blagg et al. | |
| 7,100,195 B1 | 8/2006 | Underwood | |
| 7,110,979 B2 | 9/2006 | Tree | |
| 7,143,064 B2 | 11/2006 | Picciallo et al. | |
| 7,146,338 B2 | 12/2006 | Kight et al. | |
| 7,147,149 B2 | 12/2006 | Giraldin et al. | |
| 7,165,041 B1 | 1/2007 | Guheen et al. | |
| 7,171,370 B2 | 1/2007 | Burke | |
| 7,175,073 B2 | 2/2007 | Kelley et al. | |
| 7,184,979 B1 | 2/2007 | Carson | |
| 7,248,855 B2 | 7/2007 | Joyce et al. | |
| 7,249,092 B2 | 7/2007 | Dunn et al. | |
| 7,249,097 B2 | 7/2007 | Hutchison et al. | |
| 7,263,507 B1 | 8/2007 | Brake, Jr. et al. | |
| 7,264,153 B1 | 9/2007 | Burke | |
| 7,319,986 B2 | 1/2008 | Praisner et al. | |
| 7,328,839 B2 | 2/2008 | Keohane et al. | |
| 7,346,528 B2 | 3/2008 | Thengvall et al. | |
| 7,376,569 B2 | 5/2008 | Plunkett et al. | |
| 7,379,887 B2 | 5/2008 | Pachon et al. | |
| 7,382,773 B2 | 6/2008 | Schoeneberger et al. | |
| 7,401,731 B1 | 7/2008 | Pietz et al. | |
| 7,502,758 B2 | 3/2009 | Burke | |
| 7,536,351 B2 | 5/2009 | Leblang et al. | |
| 7,571,849 B2 | 8/2009 | Burke | |
| 7,577,665 B2 | 8/2009 | Ramer et al. | |
| 7,580,881 B2 | 8/2009 | Singer et al. | |
| 7,620,573 B2 | 11/2009 | Jameson | |
| 7,627,512 B2 | 12/2009 | Harris et al. | |
| 7,647,322 B2 | 1/2010 | Thomsen | |
| 7,660,581 B2 | 2/2010 | Ramer et al. | |
| 7,668,768 B2 | 2/2010 | Oikonomidis | |
| 7,672,861 B2 | 3/2010 | Al-Otaibi et al. | |
| 7,685,083 B2 | 3/2010 | Fairweather | |
| 7,707,052 B2 | 4/2010 | Kuhn et al. | |
| 7,716,217 B2 | 5/2010 | Marston et al. | |
| 7,729,959 B1 | 6/2010 | Wells et al. | |
| 7,752,123 B2 | 7/2010 | Brookfield et al. | |
| 7,774,257 B2 | 8/2010 | Maggioncalda et al. | |
| 7,783,564 B2 | 8/2010 | Mullen et al. | |
| 7,788,146 B2 | 8/2010 | McCarthy, Jr. | |
| 7,792,748 B1 | 9/2010 | Ebersole et al. | |
| 7,797,181 B2 | 9/2010 | Vianello | |
| 7,797,218 B2 | 9/2010 | Rosen et al. | |
| 7,797,226 B2 | 9/2010 | Ram et al. | |
| 7,818,233 B1 | 10/2010 | Sloan et al. | |
| 7,831,494 B2 | 11/2010 | Sloan et al. | |
| 7,835,972 B2 | 11/2010 | Almeida et al. | |
| 7,844,492 B2 | 11/2010 | Perkowski et al. | |
| 7,844,546 B2 | 11/2010 | Fleishman | |
| 7,848,948 B2 | 12/2010 | Perkowski et al. | |
| 7,860,871 B2 | 12/2010 | Ramer et al. | |
| 7,865,187 B2 | 1/2011 | Ramer et al. | |
| 7,870,066 B2 | 1/2011 | Lin | |
| 7,912,790 B2 | 3/2011 | Albertsson | |
| 7,937,292 B2 | 5/2011 | Baig et al. | |
| 7,962,419 B2 | 6/2011 | Gupta et al. | |
| 8,086,558 B2 | 12/2011 | Dewar | |
| 8,099,350 B2 | 1/2012 | Ryder | |
| 2001/0037315 A1 | 11/2001 | Saliba et al. | |
| 2001/0047310 A1 | 11/2001 | Russell | |
| 2002/0002479 A1 | 1/2002 | Almog et al. | |
| 2002/0007330 A1 | 1/2002 | Kumar et al. | |
| 2002/0026412 A1 | 2/2002 | Kabin | |
| 2002/0046074 A1 | 4/2002 | Barton | |
| 2002/0052773 A1 | 5/2002 | Kraemer et al. | |
| 2002/0055870 A1 | 5/2002 | Thomas | |
| 2002/0077955 A1 | 6/2002 | Ramm | |
| 2002/0095363 A1 | 7/2002 | Sloan et al. | |
| 2002/0099635 A1 | 7/2002 | Guiragosian | |
| 2002/0103805 A1 | 8/2002 | Canner et al. | |
| 2002/0120568 A1 | 8/2002 | Leblang et al. | |
| 2002/0123949 A1 | 9/2002 | VanLeeuwen | |
| 2002/0133368 A1 | 9/2002 | Strutt et al. | |
| 2002/0147672 A1 | 10/2002 | Gaini | |
| 2002/0152158 A1 | 10/2002 | Paleiov et al. | |
| 2002/0188536 A1 | 12/2002 | Molosavljevic et al. | |
| 2003/0009411 A1 | 1/2003 | Ram et al. | |
| 2003/0028483 A1 | 2/2003 | Sanders et al. | |
| 2003/0033226 A1 | 2/2003 | Anderson | |
| 2003/0050889 A1 | 3/2003 | Burke | |
| 2003/0055758 A1 | 3/2003 | Sidhu et al. | |
| 2003/0083930 A1 | 5/2003 | Burke | |
| 2003/0177027 A1 | 9/2003 | DiMarco | |
| 2003/0216957 A1 | 11/2003 | Florence et al. | |
| 2003/0221118 A1 | 11/2003 | Walker | |
| 2004/0012588 A1 | 1/2004 | Lulis | |
| 2004/0019543 A1 | 1/2004 | Blagg et al. | |
| 2004/0054610 A1 | 3/2004 | Amstutz et al. | |
| 2004/0068432 A1 | 4/2004 | Meyerkopf et al. | |
| 2004/0088177 A1 | 5/2004 | Travis et al. | |
| 2004/0107112 A1 | 6/2004 | Cotter | |
| 2004/0117202 A1 | 6/2004 | Winklevoss et al. | |
| 2004/0148234 A1 | 7/2004 | Gonen-Friedman et al. | |
| 2004/0158513 A1 | 8/2004 | Musacchio | |
| 2004/0186852 A1 | 9/2004 | Rosen | |
| 2004/0192351 A1 | 9/2004 | Duncan | |
| 2004/0215560 A1 | 10/2004 | Amalraj et al. | |
| 2004/0254805 A1 | 12/2004 | Schwerin-Wenzel et al. | |
| 2004/0267559 A1 | 12/2004 | Hinderer et al. | |
| 2005/0026119 A1 | 2/2005 | Ellis et al. | |
| 2005/0027632 A1 | 2/2005 | Zeitoun et al. | |
| 2005/0060228 A1 | 3/2005 | Woo | |
| 2005/0060318 A1 | 3/2005 | Brickman, Jr. | |
| 2005/0080691 A1 | 4/2005 | Holm-Blagg | |
| 2005/0086075 A1 | 4/2005 | Kaehler et al. | |
| 2005/0154662 A1 | 7/2005 | Langenwalter | |
| 2005/0164151 A1 | 7/2005 | Klein | |
| 2005/0187804 A1 | 8/2005 | Clancy et al. | |
| 2005/0240431 A1 | 10/2005 | Cotter | |
| 2005/0282126 A1 | 12/2005 | Pesso | |
| 2006/0064378 A1 | 3/2006 | Clementz et al. | |
| 2006/0069635 A1 | 3/2006 | Ram et al. | |
| 2006/0095331 A1 | 5/2006 | O'Malley et al. | |
| 2006/0100919 A1 | 5/2006 | Levine | |
| 2006/0122922 A1 | 6/2006 | Lowenthal | |
| 2006/0122923 A1 | 6/2006 | Burke | |
| 2006/0149609 A1 | 7/2006 | Stenerson et al. | |
| 2006/0163341 A1* | 7/2006 | Tulluri et al. | 235/379 |
| 2006/0178971 A1 | 8/2006 | Owen et al. | |
| 2006/0224478 A1 | 10/2006 | Harbison et al. | |
| 2006/0235777 A1 | 10/2006 | Takata | |
| 2006/0242084 A1 | 10/2006 | Moses | |
| 2006/0277091 A1 | 12/2006 | Kochikar et al. | |
| 2006/0277128 A1 | 12/2006 | Anandarao et al. | |
| 2006/0282353 A1 | 12/2006 | Gikandi | |
| 2006/0282369 A1 | 12/2006 | White | |
| 2007/0005477 A1 | 1/2007 | McAtamney | |

| | | |
|---|---|---|
| 2007/0005496 A1 | 1/2007 | Cataline et al. |
| 2007/0005524 A1 | 1/2007 | Iwachin |
| 2007/0034688 A1 | 2/2007 | Burke |
| 2007/0038545 A1 | 2/2007 | Smith et al. |
| 2007/0038610 A1 | 2/2007 | Omoigui |
| 2007/0055549 A1 | 3/2007 | Moore et al. |
| 2007/0055602 A1 | 3/2007 | Mohn |
| 2007/0060109 A1 | 3/2007 | Ramer et al. |
| 2007/0060173 A1 | 3/2007 | Ramer et al. |
| 2007/0061252 A1 | 3/2007 | Burke |
| 2007/0061257 A1 | 3/2007 | Neofytides et al. |
| 2007/0061333 A1 | 3/2007 | Ramer et al. |
| 2007/0083465 A1 | 4/2007 | Ciurea et al. |
| 2007/0094130 A1 | 4/2007 | Burke |
| 2007/0100749 A1 | 5/2007 | Bachu et al. |
| 2007/0112662 A1 | 5/2007 | Kumar |
| 2007/0156519 A1 | 7/2007 | Agassi et al. |
| 2007/0162301 A1 | 7/2007 | Sussman et al. |
| 2007/0162387 A1 | 7/2007 | Cataline et al. |
| 2007/0179841 A1 | 8/2007 | Agassi et al. |
| 2007/0185721 A1 | 8/2007 | Agassi et al. |
| 2007/0192318 A1 | 8/2007 | Ramer et al. |
| 2007/0208588 A1 | 9/2007 | Rhoades et al. |
| 2007/0208624 A1 | 9/2007 | Gallagher |
| 2007/0214162 A1 | 9/2007 | Rice |
| 2007/0231777 A1 | 10/2007 | Dimarco |
| 2007/0241120 A1 | 10/2007 | Henry |
| 2007/0255965 A1 | 11/2007 | McGucken |
| 2007/0298392 A1 | 12/2007 | Mitchell |
| 2008/0015970 A1 | 1/2008 | Brookfield et al. |
| 2008/0015988 A1 | 1/2008 | Brown et al. |
| 2008/0040845 A1 | 2/2008 | Shoshan |
| 2008/0060241 A1 | 3/2008 | Molinaro |
| 2008/0120129 A1 | 5/2008 | Seubert et al. |
| 2008/0133393 A1 | 6/2008 | Arnold et al. |
| 2008/0140559 A1 | 6/2008 | Ram et al. |
| 2008/0183545 A1 | 7/2008 | Deitrich et al. |
| 2008/0195512 A1 | 8/2008 | Klebanoff et al. |
| 2008/0195556 A1 | 8/2008 | Vioni |
| 2008/0201208 A1 | 8/2008 | Tie et al. |
| 2008/0208638 A1 | 8/2008 | Davidson et al. |
| 2008/0243716 A1 | 10/2008 | Ouimet et al. |
| 2008/0249936 A1 | 10/2008 | Miller et al. |
| 2008/0319781 A1 | 12/2008 | Stivoric et al. |
| 2009/0006418 A1 | 1/2009 | O'Malley |
| 2009/0063353 A1 | 3/2009 | Viidu et al. |
| 2009/0092241 A1 | 4/2009 | Minert et al. |
| 2009/0094170 A1 | 4/2009 | Mohn |
| 2009/0112674 A1 | 4/2009 | Musso et al. |
| 2009/0119013 A1 | 5/2009 | O'Malley |
| 2009/0132313 A1 | 5/2009 | Chandler et al. |
| 2009/0138341 A1 | 5/2009 | Mohan et al. |
| 2009/0177688 A1 | 7/2009 | Karlsen et al. |
| 2009/0182664 A1* | 7/2009 | Trombley ............... 705/42 |
| 2009/0192874 A1 | 7/2009 | Powles et al. |
| 2009/0204448 A1 | 8/2009 | Kaehler et al. |
| 2009/0204455 A1 | 8/2009 | Rubin |
| 2009/0204538 A1 | 8/2009 | Ley et al. |
| 2009/0216641 A1 | 8/2009 | Hubbard |
| 2009/0234697 A1 | 9/2009 | Taguchi |
| 2009/0254469 A1 | 10/2009 | Robertson |
| 2009/0276231 A1 | 11/2009 | Bazigos et al. |
| 2009/0276258 A1 | 11/2009 | Dane |
| 2009/0292648 A1 | 11/2009 | Damschroder et al. |
| 2009/0319289 A1 | 12/2009 | Pande |
| 2009/0319344 A1 | 12/2009 | Tepper et al. |
| 2009/0327051 A1 | 12/2009 | Nerby |
| 2009/0327106 A1 | 12/2009 | Bartelt et al. |
| 2010/0023385 A1 | 1/2010 | Galvan |
| 2010/0030671 A1 | 2/2010 | Gelerman |
| 2010/0063981 A1 | 3/2010 | Thomsen |
| 2010/0070323 A1 | 3/2010 | Polcari et al. |
| 2010/0070448 A1 | 3/2010 | Omoigui |
| 2010/0100424 A1 | 4/2010 | Buchanan et al. |
| 2010/0100427 A1 | 4/2010 | McKeown et al. |
| 2010/0100464 A1 | 4/2010 | Ellis et al. |
| 2010/0100469 A1 | 4/2010 | Buchanan et al. |
| 2010/0100470 A1 | 4/2010 | Buchanan et al. |
| 2010/0100561 A1 | 4/2010 | Cooper et al. |
| 2010/0106566 A1 | 4/2010 | Al-Otaibi et al. |
| 2010/0114672 A1 | 5/2010 | Klaus et al. |
| 2010/0125475 A1 | 5/2010 | Twyman |
| 2010/0131306 A1 | 5/2010 | Koo |
| 2010/0145861 A1 | 6/2010 | Law et al. |
| 2010/0145876 A1 | 6/2010 | Pessin |
| 2010/0153211 A1 | 6/2010 | Ramer et al. |
| 2010/0179916 A1 | 7/2010 | Johns et al. |
| 2010/0180029 A1 | 7/2010 | Fourman |
| 2010/0198863 A1 | 8/2010 | Lee et al. |
| 2010/0217652 A1 | 8/2010 | Brooks Rix |
| 2010/0235299 A1 | 9/2010 | Considine |
| 2010/0287086 A1 | 11/2010 | Harris et al. |
| 2010/0299277 A1 | 11/2010 | Emelo et al. |
| 2010/0306017 A1 | 12/2010 | Dreyfuss et al. |
| 2010/0312713 A1 | 12/2010 | Keltner |
| 2010/0312718 A1 | 12/2010 | Rosenthal et al. |
| 2010/0332379 A1 | 12/2010 | Ram et al. |
| 2011/0173118 A1 | 7/2011 | Hu |
| 2011/0276494 A1 | 11/2011 | Hutchinson et al. |
| 2011/0282803 A1 | 11/2011 | Woods et al. |

OTHER PUBLICATIONS

Office Action dated Sep. 16, 2009 for U.S. Appl. No. 12/152,028, filed May 12, 2008.

U.S. Appl. No. 12/152,028, filed May 12, 2008.

U.S. Appl. No. 12/152,074, filed May 12, 2008.

U.S. Appl. No. 12/120,995, filed May 15, 2008.

U.S. Appl. No. 12/172,541, filed Jul. 14, 2008.

U.S. Appl. No. 12/479,378, filed Jun. 5, 2009.

Ronald Lipman, "Adding family to credit card not always wise," Houston Chronicle, dated Jan. 18, 2008, printed from chron.com, 2 pages.

Lawrence Kutner, "Parent & Child," The New York Times, dated Aug. 19, 1993, printed from http://query.nytimes.com/gst/fullpage.html?res=9F0CE1DA153CF93AA2575BC0A965958260&sec=&, Internet site, accessed on Feb. 1, 2008, 3 pages.

Jane J. Kim, "Managing Your Money in Public View," The Wall Street Journal, dated Jun. 14, 2007, printed from http://online.wsj.com/article/SB118177906703834565.html, Internet site, accessed on Apr. 11, 2008, 5 pages.

"Obopay—Money Transfer by Cell Phone or Web," printed from https://www.obopay.com/consumer/GetHelp.do?target=HelpHowWorks, Internet site, accessed on Apr. 11, 2008, 4 pages.

"BillMonk.com," printed from https://www.billmonk.com/about/tour, Internet site, accessed on Apr. 11, 2008, 8 pages.

"Split It by TD Canada Trust Facebook," printed from http://www.facebook.com/apps/application.php?id=4245957541&ref=nf, Internet site, accessed on Apr. 11, 2008, 2 pages.

"ING Direct Electric Orange Checking Account," printed from http://banking.about.com/od/checkingaccounts/p/ingchecking.htm, Internet site, accessed on Apr. 11, 2008, 1 page.

"Know your financial health—at a glance!" printed from http://www.buxfer.com/tour.php?id=HomePage, Internet site, accessed on Apr. 11, 2008, 1 page.

"Use Buxfer's analytics to understand your finances," printed from http://www.buxfer.com/tour.php?id=Analytics, Internet site, accessed on Apr. 11, 2008, 1 page.

"Use Buxfer Groups to simplify shared finances," printed from http://www.buxfer.com/tour.php?id=Groups, Internet site, accessed on Apr. 11, 2008, 1 page.

"Report transactions easily; let Buxfer deal with the math," printed from http://www.buxfer.com/tour.php?id=Reporting, Internet site, accessed on Apr. 11, 2008, 1 page.

"Import statements from banks or credit card accounts," printed from http://www.buxfer.com/tour.php?id=Import, Internet site, accessed on Apr. 11, 2008, 1 page.

"Slice and dice through your transactions," printed from http://www.buxfer.com/tour.php?=Filters, Internet site, accessed on Apr. 11, 2008, 1 page.

"Transfer money online with Amazon Payments," printed from http://www.buxfer.com/tour.pbp?id=Send money, Internet site, accessed on Apr. 11, 2008, 1 page.

"Setup budgets to control your expenses," printed from http://www.buxfer.com/tour.php?id=Budgets, Internet site, accessed on Apr. 11, 2008, 1 page.

"Access Buxfer while on the move!" printed from http://www.buxfer.com/tour.php?id=Mobile, Internet site, accessed on Apr. 11, 2008, 1 page.

"Take Buxfer with you on the Internet everywhere!" printed from http://www.buxfer.com/tour.php?id=Gadgets, Internet site, accessed on Apr. 11, 2008, 1 page.

"Amazon Payments Account Management," printed from https://payments.amazon.com/sdui/sdui/paymentabout?about=true, Internet site, accessed on Apr. 11, 2008, 1 page.

"Living with a Roommate in Memphis," memphis apartments tv.com, dated Feb. 15, 2007, printed from http://www.memphisapartmentstv.com/living-with-a-roommate-in-memphis/, Internet site, accessed on Sep. 18, 2007, 2 pages.

"Billshare—a simple app for people who share bills," printed from http://billshare.org/, Internet site, accessed on Sep. 18, 2007, 2 pages.

"Get More from Your PayPal Account," printed from https://www.paypal.com/us/cgi-bin/webscr?cmd=xpt/cps/general/AccountOverview-outside, Internet site, accessed on Sep. 18, 2007, 2 pages.

"How PayPay Works—PayPal," printed from https://www.paypal.com/us/cgi-bin/webscr?cmd=xpt/cps/general/NewConsumerWorks-outside, Internet site, accessed on Sep. 18, 2007, 3 pages.

"Sending Money Person-to-Person is Easy," printed from https://www.paypal.com/us/cgi-bin/webscr?cmd=xpt/cps/general/PersonPayments-outside, Internet site, accessed on Sep. 18, 2007, 1 page.

"Track Your Online Spending," printed from https://www.paypal.com/us/cgi-bin/webscr?cmd=xpt/cps/general/TrackingMoney-outside, Internet site, accessed on Sep. 18, 2007, 2 pages.

"Enter Details—PayPal," printed from https://www.paypal.com/us/cgi-bin/webscr?cmd=_flow&SESSION=6paX9BKc4FK4EJ8, Internet site, accessed on Sep. 18, 2007, 1 page.

"Review Payment Details—PayPal," printed from https://www.paypal.com/us/cgi-bin/webscr?cmd=_flow&SESSION=RMXX7KRminYnF, Internet site, accessed on Sep. 18, 2007, 1 page.

"Savings Plan," printed from http://quicken.intuit.com/images/screenshots/ss_savings_plan_lrg.gif, Internet site, accessed on Mar. 19, 2008, 1 page.

"Quicken Deluxe 2008," printed from http://quicken.intuit.com/personal-finance/deluxe-money-management.jhtml, Internet site, accessed on Mar. 19, 2008, 7 pages.

"SMS Banking," brochure by Acette Technologies FZ LLC, dated 2007, 3 pages.

Tim Ferguson, "Mobile banking rolled out by HSBC," dated Oct. 4, 2006, printed from http://www.silicon.com/financialservices/0,3800010322,39162983,00.htm, Internet site, accessed on Oct. 11, 2007, 2 pages.

Julian Goldsmith, "Cashing in on the ATM revolution," dated May 2, 2007, printed from http://www.silicon.com/financialservices/0,3800010322,39166938,00.htm, Internet site, accessed on Oct. 11, 2007, 3 pages.

Shelley Elmblad, "Online Banking is Easy on Budgets," dated May 22, 2007, printed from http://building-personal-savings.suite101.com/article.cfm/online_banking_get_the_facts, Internet site, accessed on Oct. 12, 2007, 2 pages.

John R. Quain, "Cellphone Banking Is Coming of Age," dated May 24, 2007, printed from http://www.nytimes.com/2007/05/24/technology/24basics.html?_r=1&oref=slogin, Internet site, accessed on Oct. 12, 2007, 4 pages.

"Ducont—Mobile Payments," printed from http://www.ducont.com/Products/bnf_mdhm.htm, Internet site, accessed on Oct. 11, 2007, 1 page.

"Ducont—Bank.companion," printed from http://www.ducont.com/Products/bnf_bankcomp.htm, Internet site, accessed on Oct. 11, 2007, 1 page.

"MyCheckFree.com," printed from https://mycheckfree.com/br/wps?sp=10001&rq=bfbl, Internet site, accessed on Sep. 14, 2007, 1 page.

"About CheckFree," printed from https://mycheckfree.com/br/wps?rg=login&slpg=Y&file=authentication/login_baseline_about-checkfree&esc=93096239&sp=, Internet site, accessed on Sep. 14, 2007, 1 page.

"MyCheckFree—Frequently Asked Questions," printed from https://mycheckfree.com/br/wps?rg=login&slpg=Y&file=authentication/login_baseline_faq&esc=93096239&sp=10001, Internet site, accessed on Sep. 14, 2007, 5 pages.

"Paytrust : Paying Bills Has Never Been Easier," printed from http://www.paytrust.com/learnmore.shtml, Internet site, accessed on Sep. 14, 2007, 2 pages.

"Why Use Paytrust® Instead of a Traditional Bill-Pay Service?" printed from http://www.paytrust.com/morethanbillpay.shtml, Internet site, accessed on Sep. 14, 2007, 3 pages.

"Paytrust: Frequently Asked Questions," printed from http://www.paytrust.com/commonquestions.shtml, Internet site, accessed on Sep. 14, 2007, 5 pages.

"Pocket Quicken," printed from http://www.landware.com/pocketquicken, Internet site, accessed on Sep. 14, 2007, 2 pages.

"Mobile Quicken™—Stand Alone or Connect with a Click," printed from http://www.landware.com/pocketquicken/moreinfo.html, Internet site, accessed on Sep. 14, 2007, 4 pages.

"UnitedOne Credit Union," printed from http://www.unitedone.org/ASP/home.asp, Internet site, accessed on Sep. 14, 2007, 3 pages.

"UnitedOne Credit Union—Calendar Help," printed from https://s146.lanxtra.com/servlet/EchoTemplateServlet?template=/2/en/IBHelp.vm&help=10901, Internet site, accessed on Sep. 14, 2007, 5 pages.

"Quicken Starter Edition 2008," printed from http://quicken.intuit.com/personal-finance/starter-edition-personal-budget.jhtml, Internet site, accessed on Sep. 14, 2007, 5 pages.

"Jul. 2007 calendar," printed from http://quicken.intuit.com/images/screenshots/ss_calendar_lrg.gif, Internet site, accessed on Sep. 14, 2007, 1 page.

"Navigator," dated Jul. 2006, printed from www.pscu.org, Internet site accessed on Oct. 17, 2007, 2 pages.

"Bank of America Privacy Assist Premier™—Protect your credit and identity," printed from http://www.bankofamerica.com/pap/index.cfm?template=pap_assist_premier, Internet site, accessed on Oct. 17, 2007, 2 pages.

"Identity Theft Protection—Bank of America Privacy Assist Premier™," printed from http://www.bankofamerica.com/pap/index.cfm?template=pap_assist_premier, Internet site, accessed on Oct. 17, 2007, 2 pages.

"Bank of America—Online Bill Pay and e-Bills Frequently Asked Questions," printed from http://www.bankofamerica.com/onlinebanking/index.cfm?template=faq_billpay, Internet site, accessed on Oct. 17, 2007, 2 pages.

"Technology Credit Union," printed from http://www.techcu.com/resources/about_tech_cu/privacy/online.htm, Internet site, accessed on Oct. 17, 2007, 1 page.

"Billshare.org—Make Bill Paying with Roomies Easy—KillerStartups.com," printed from http://www.killerstartups.com/Web20/billshare—Make-Bill-Paying-with-Roomies-Easy/, Internet site, accessed on Sep. 18, 2007, 4 pages.

Every Penny Counts, Inc., Patent Property Due Diligence Chart, prepared Aug. 30, 2007, 8 pages.

Office Action dated Apr. 29, 2009 for U.S. Appl. No. 12/172,541, filed Jul. 14, 2008.

Office Action dated Apr. 2, 2009 for U.S. Appl. No. 12/152,028, filed May 12, 2008.

U.S. Appl. No. 12/803,707, filed Jul. 2, 2010.
U.S. Appl. No. 12/803,706, filed Jul. 2, 2010.
U.S. Appl. No. 12/754,967, filed Jul. 2, 2010.
U.S. Appl. No. 12/754,974, filed Apr. 6, 2010.
U.S. Appl. No. 12/803,705, filed Jul. 2, 2010.
U.S. Appl. No. 12/803,684, filed Jul. 2, 2010.
U.S. Appl. No. 13/324,534, filed Dec. 13, 2011.
U.S. Appl. No. 13/324,575, filed Dec. 13, 2011.
U.S. Appl. No. 13/324,596, filed Dec. 13, 2011.
U.S. Appl. No. 13/355,056, filed Jan. 20, 2012.

"How can I automatically generate an index in Word?," printed from http://word.mvps.org/faqs/formattinq/CreateIndexContent.htm, Internet site, accessed on Feb. 17, 2011, 4 pages.

"PeopleSoft Enterprise Human Capital Management—Employee Benefits and Compensation Modules," printed from http://www.2020software.com/products/PeopleSoft_Enterprise_Human_Capital_Management_Employee_Benefits_and_Compensation_Modules.asp., Internet site, accessed on Jul. 17, 2011, 7 pages.

"FREE Online Employee Attendance Tracking Software," printed from http://www.tracksmart.com, Internet site, accessed on Jul. 17, 2011, 2 pages.

"Compensation Software Solutions for Small Business I Taleo," printed from http://www.taleo.com/solutions/taleo-business-edition-comp?_kk=HR%, Internet site, accessed on Jul. 17, 2011, 1 page.

"Tracking training has never been so easy." printed from http://www.conductit.com/, Internet site, accessed on Jul. 17, 2011, 2 pages.

"Track Employee Training Easily with Conductor® Employee Education Training Tracking Software," printed from http://www.conductit.com/product.asp, Internet site, accessed on Jul. 17, 2011, 2 pages.

"HSBC Employee Career Track Information," printed from http://www.hsbcusa.com/careers/hsbc_employees/impacted_employee_information.html, Internet site, accessed on Jul. 17, 2011, 2 pages.

"Conductor® at a glance Take the Quick Tour!" printed from http://www.conductit.com/tour.asp#1, Internet site, accessed on Jul. 17, 2011, 11 pages.

"Replicon—Time Tracking made Easy with Web TimeSheet," printed from http://www.replicon.com/Ip/Ip_ta_vacation_tracking.aspx?, Internet site, accessed on Jul. 17, 2011, 2 pages.

Office Action dated Aug. 4, 2011 for U.S. Appl. No. 12/479,378, filed Jun. 5, 2009.

Office Action dated Jan. 3, 2012 for U.S. Appl. No. 12/696,968, filed Jan. 29, 2010.

Office Action dated Jan. 3, 2012 for U.S. Appl. No. 12/696,959, filed Jan. 29, 2010.

Office Action dated Mar. 21, 2012 for U.S. Appl. No. 12/366,711, filed Feb. 6, 2009.

Office Action dated Mar. 15, 2012 for U.S. Appl. No. 12/479,378, filed Jun. 5, 2009.

Office Action dated Feb. 1, 2012 for U.S. Appl. No. 12/696,647, filed Jan. 29, 2010.

Office Action dated Apr. 18, 2012 for U.S. Appl. No. 13/037,063, filed Feb. 28, 2011.

Yahoo! UI Library: Slider, accessed via Way Back Machine, Oct. 6, 2006, http://web.archive.org/web/20061006221351/http://developer.yahoo.com/yui/slider/, on Mar. 8, 2012, 3 pages.

U.S. Appl. No. 12/689,375, filed Jan. 19, 2010.
U.S. Appl. No. 12/689,380, filed Jan. 19, 2010.
U.S. Appl. No. 12/696,959, filed Jan. 29, 2010.
U.S. Appl. No, 12/696,968, filed Jan. 29, 2010.
U.S. Appl. No. 12/696,647, filed Jan. 29, 2010.
U.S. Appl. No. 13/037,063, filed Feb. 28, 2011.
U.S. Appl. No. 13/037,072, filed Feb. 28, 2011.
U.S. Appl. No. 13/037,086, filed Feb. 28, 2011.
U.S. Appl. No. 13/037,096, filed Feb. 28, 2011.

David A. Moss, Gibbs A. Johnson, "The rise of consumer bankruptcy: Evolution, revolution, or both?" *American Bankruptcy Law Journal*, v. 73, n. 2, pp. 311-351, Spring 1999, printed from http://dialogquicksearch.dialog.com/USPTO/search/getDocument.action?r=5cb38c39-dcc8, Internet site, accessed on Sep. 26, 2010, 25 pages.

Tom Rawstorne, "What's your child buying online?: Alcohol, knives, pornography . . . All bought over the internet by a 14-year-old boy using a debit card. So why are the banks giving them to chiidren without telling their parents?" *Daily Mail*, London, Jul. 10, 2008, p. 50, retrieved Jun. 30, 2011, 5 pages.

CNNMoney.com, "What are you worth?" printed from http://web.archive.org/web/20021008185050/http://cgi.money.cnn.com/tools/networth/networth.html, Internet site, accessed on Jul. 13, 2011, 2 pages.

Office Action dated Jun. 15, 2010 for U.S. Appl. No. 12/152,028, filed May 12, 2008.

Office Action dated Oct. 1, 2010 for U.S. Appl. No. 12/152,074, filed May 12, 2008.

Office Action dated Apr. 13, 2010 for U.S. Appl. No. 12/120,995, filed May 15, 2008.

Notice of Allowance dated Sep. 23, 2010 for U.S. Appl. No. 12/120,995, filed May 15, 2008.

Office Action dated Jan. 19, 2010 for U.S. Appl. No. 12/172,541, filed Jul. 14, 2008.

Notice of Allowance dated Jul. 11, 2011 for U.S. Appl. No. 12/172,541, filed Jul. 14, 2008.

Office Action dated Jul. 8, 2011 for U.S. Appl. No. 12/368,711, filed Feb. 6, 2009.

* cited by examiner

TRANSFERRING FUNDS BETWEEN PARTIES' FINANCIAL ACCOUNTS

BACKGROUND

Banking institutions frequently offer Internet banking products and services to their customers as an alternative to traditional "brick and mortar" banking channels. Such products and services are typically provided via a user interface (UI) of a secure banking Web site that is hosted by the bank and that is remotely accessible by its customers using, for example, a personal computer (PC) or other network-enabled device. Products and services that may be offered to Internet banking customers include, for example, account balance inquiries, electronic funds transfers, transaction information downloads, bill presentment and payment, loan applications, and investment services.

Although existing Internet banking products and services allow customers to manage their accounts and make transfers to billing parties, the inventors have recognized a need for enhanced products and services facilitating transfers of funds among customers and between customers and other parties.

FIGURES

DESCRIPTION

Various embodiments may be directed to requesting and causing transfers of funds between customers of the financial institution. This functionality may be useful to any financial institution customers who have need to transfer funds between themselves or with other parties for any reason. For example, this functionality may be useful to financial institution customers who are roommates and have need to split household bills such as, for example, bills for utilities. Also, parties having a contractual or other relationships requiring inter-party monetary transfers may utilize the functionality.

Figure 1:
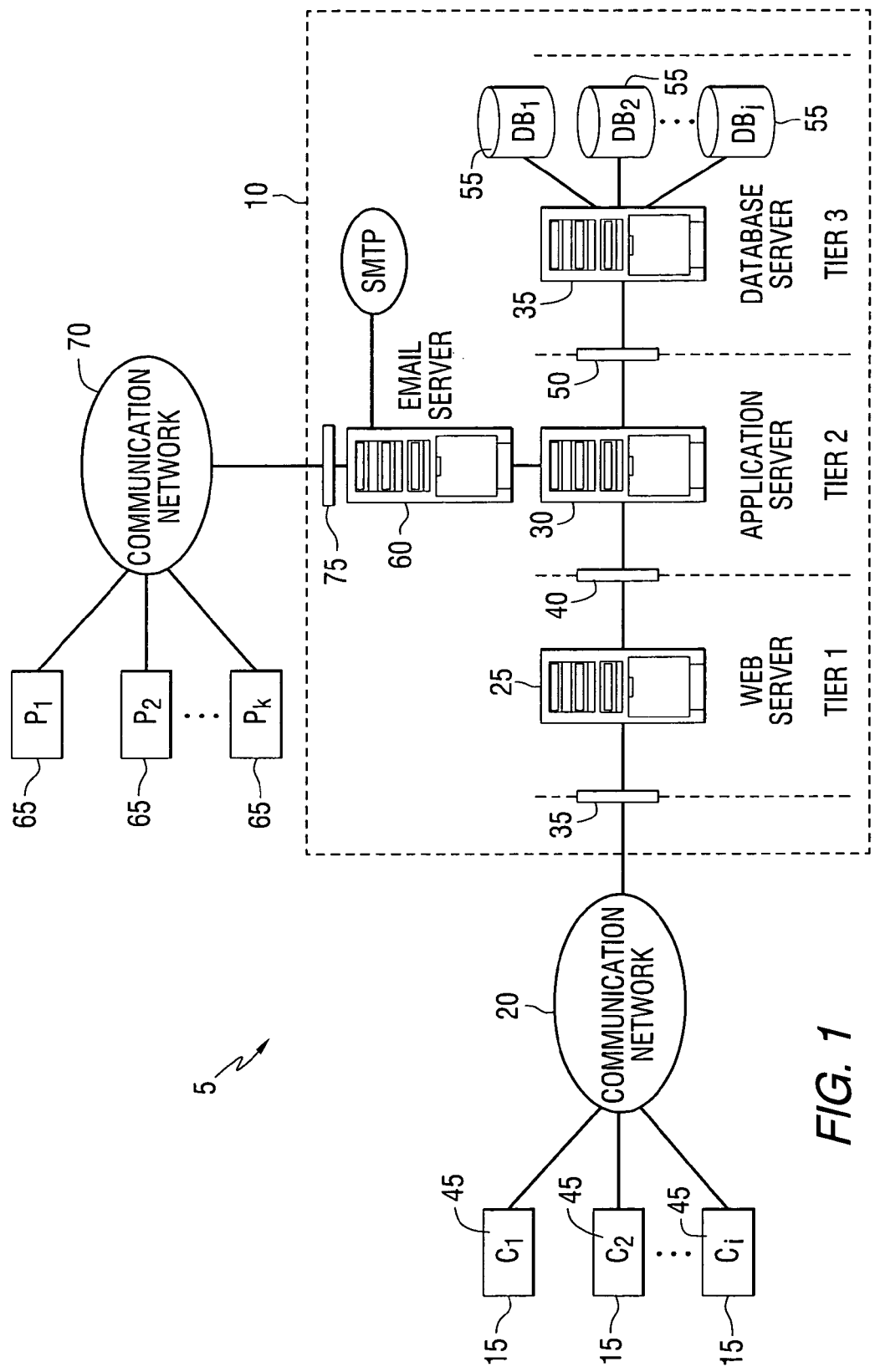
FIG. 1 illustrates one embodiment of a system, which may be implemented by a financial institution to provide network-based banking products for its customers.

FIG. 1 illustrates one embodiment of a system 5, which may be implemented by a financial institution to provide network-based banking products for its customers. For example, the system 5 may be used to facilitate the payment of bills and to facilitate monetary transfers between customers of the financial institution. As shown, the system 5 may include a host system 10 in communication with one or more client devices 15 (hereinafter "clients") via a communication network 20. Each client 15 may be associated with one or more customers of the financial institution and may allow the customers to access the network-based banking products. In the example embodiments described herein, the communication network 20 is implemented using the Internet, although it will be understood that other wired or wireless, public or private communication networks suitable for enabling the exchange of information between the host system 10 and clients 15 may be used instead.

The host system 10 may be constructed and arranged with any suitable combination of components. For example, according to various embodiments, the host system 10 may be arranged in a tiered network architecture and include a Web server 25, an application server 30, and a database server 35. The Web server 25 may correspond to a first tier of the host system 10 and communicate with the communication network 20 (e.g., the Internet) and the application server 30 via a border firewall 35 and an application firewall 40, respectively. The Web server 25 may be configured to accept requests from one or more of the clients 15 via the communication network 20 and provide responses. The requests and responses may be formatted according to Hypertext Transfer Protocol (HTTP) or any other suitable format. The responses may include, for example, static and/or dynamic documents for providing an Internet banking user interface (UI) 45 to customers via the clients 15. The documents may be formatted according to the Hypertext Markup Language (HTML) or any other suitable format. The Web server 25 may further be configured to authenticate each customer's credentials before allowing access to the UI 45 and other banking resources. Such authentication may be performed, for example, using a user name and a password. Additional security measures may be utilized in the authentication process if desired.

A second tier of the host system 10 may comprise an application server 30. The application server 30 may communicate with the Web server 25 and the data base server 35 (e.g., Tier 3) via the application firewall 40 and an internal firewall 50, respectively. The application server 30 may host one or more Internet banking applications for executing the business logic associated with Internet banking features of the UI 45. The application server 30 may receive customer-entered information from the UI 45 of each client 15 via the Web server 25. Such information may include, for example, a user name and password, customer requests to access particular Internet banking features, etc. Based on this and other information received from the clients 15 via the Web server 25, the application server 30 may perform transactions (e.g., transfer funds between accounts, retrieve account balances, transfer amounts to other customer, etc.) and generate corresponding informational content (e.g., transfer confirmations, account balance information, etc.). Information regarding such transactions may be communicated to the Web server 25 and subsequently presented to the customers using, for example, a dynamic Web page of the UI 45.

The third tier of the host system 10 may comprise a database server 35, which may communicate with the application server 30 via the internal firewall 50. The database server 35 may manage one or more databases 55 containing data necessary for supporting one or more Internet banking features. Such databases may include, for example, an account information database, a customer information database, a customer preferences/settings database, as well as other databases for storing additional settings and/or configurations. Such information may be retrieved, processed and updated as needed by the application server 30 based on the particular Internet banking features(s) being used.

The clients 15 may include any suitable network-enabled devices such as, for example, personal computers (PC's), automated teller machines (ATM's), palmtop computers, cellular phones, etc. The clients 15 may be configured to transmit and receive information via the communication network 20 using a wired or wireless connection, and may include a suitable browser software application including, for example, MICROSOFT INTERNET EXPLORER, MICROSOFT INTERNET EXPLORER MOBILE, MOZILLA FIREFOX, PALM BLAZER, etc.) for enabling the customer to display, enter and interact with information exchanged via the communication network 20. The clients 15 may thus access and navigate static and/or dynamic HTML documents of the Internet banking UI 45.

The host system 10 may further include an email server 60 in communication with the application server 30 for enabling the exchange of electronic communications between clients 15 and one more parties 65 externally located with respect to the host system 10. Electronic communications may be exchanged between the email server 60 and the parties 65 via a communication network 70. Although the communication network 70 is depicted separately from the communication network 20 in FIG. 1, it will be appreciated that the communication networks 20, 70 may be implemented using a common communication network (e.g., the Internet). According to various embodiments, the e-mail server 60 and/or the application server 30 may implement an account for some or all of the customers associated with parties 65 or clients 15. Each customer's account may be accessible by the customer and may include communications directed to the customer including, for example, electronic bills, transfer requests, etc. In certain embodiments and as shown in FIG. 1, the host system 10 may include an email firewall 75 disposed between the email server 60 and the communication network. The email server 60 may implement an email server application for handling the transfer of electronic communications to and from other email servers and email clients (e.g., clients 45 and parties 65) using any suitable email protocols and standards.

Generally, a party 65 may be any person or entity with whom a client 15 desires to communicate regarding specific aspects of his finances or financial matters generally. As discussed above, such parties may include, for example, billing parties (e.g., utility companies, credit card companies, etc.). Billing parties may present to the host system 10 electronic bills payable by customers associated with clients 15. The electronic bills may be posted to a customer's account, allowing the customer to pay the bills with a transfer from a financial account. A financial account may be any type of account held by a customer at a financial institution where the financial institution keeps funds of the customer (e.g., checking accounts, savings accounts, investment accounts, etc.). According to various embodiments, parties 65 may also be non-billing parties who have an ongoing financial relationship with a customer (e.g., roommates or business partners of other customers or other parties who have need to communicate with customers utilizing clients 15).

Figure 2:
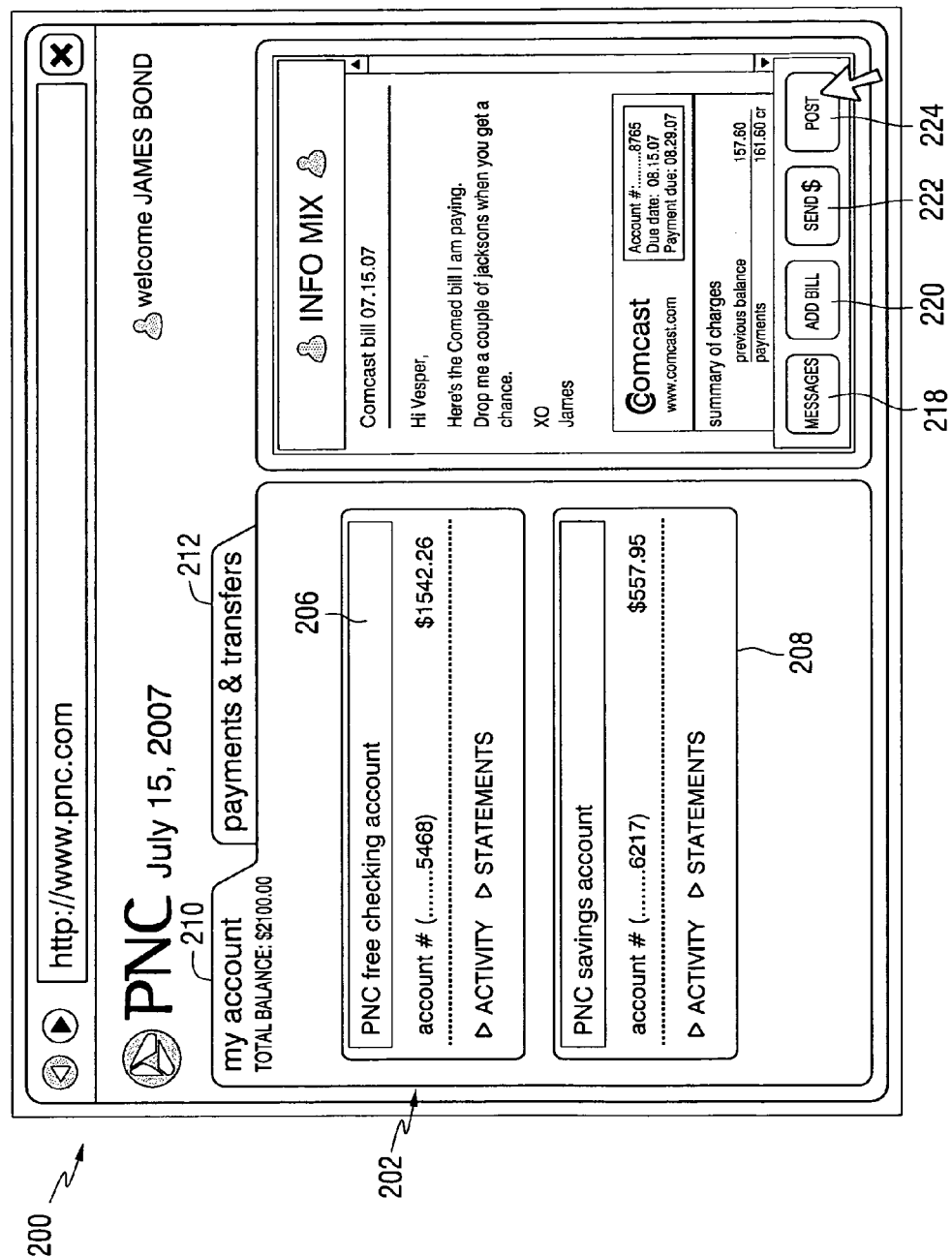
FIG. 2 illustrates a screen shot of one embodiment of a user interface that may be provided to financial institution customers to facilitate transfers of funds between the customers, and to handle bills related to more than one customer.

FIG. 2 illustrates a screen shot of one embodiment of a user interface 200 that may be provided to financial institution customers to facilitate transfers of funds between the customers, and to handle bills related to more than one customer. For example, the user interface 200 may be served to a client 15 and/or a party 65. The user interface 200 may comprise an information window 202 and a transfer window 204. The information window 202 may provide details of financial accounts held by the customer. For example, as shown in FIG. 2, the information window 202 comprises a balance tab 210 and a transactions tab 212. The balance tab 210 is selected in the view shown in FIG. 2, causing the information window 202 to display boxes corresponding to financial accounts held by the customer. For example, FIG. 2 illustrates a checking account box 206 illustrating a balance of the customer's checking account and a savings account box 208 illustrating a balance of the customer's savings account. Selecting the transactions tab 212 may cause the information window 202 to display recent transactions in the viewers financial accounts.

The transfer window 204 may provide information and functionality for requesting and effecting a transfer of funds from a first party to a second party. For example, window 214 may comprise an indication of a bill (e.g., electronic or otherwise) as well as a text message accompanying a transfer or transfer request. Optional window 216 may summarize an amount requested or an amount to be transferred and may, in various embodiments, also include the text message accompanying the transfer or transfer request. Buttons 218, 220, 222, 224 may allow a customer to add a message to a transfer request or transfer (button 218); add an indication of a bill to a transfer or transfer request (button 220); indicate an amount requested or an amount to be transferred (button 222); and/or post the request and/or transfer to an account of at least one other customer (button 224).

Figure 3:
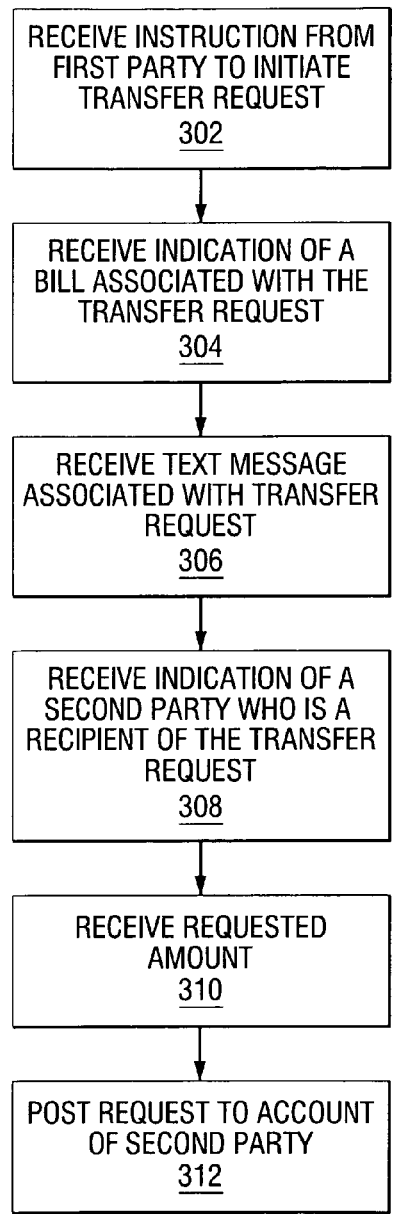
FIG. 3 illustrates one embodiment of a process flow for requesting a transfer of funds between a first party and a second party.

FIG. 3 illustrates one embodiment of a process flow 300 for requesting a transfer of funds between a first party and a second party. The first party and the second party may have any kind of financial relationship calling for a transfer of funds between them. For example, according to various embodiments, the first party and the second party may be roommates. The purpose of the transfer may be to settle a common bill. According to various embodiments, the first party and the second party may both be customers of the financial institution implementing the system 10, or may be customers of different financial institutions.

At box 302, the system 10 may receive an instruction from the first party to initiate a transfer request. For example, the instruction may be handled by a transfer application, which may be resident on the application server 30 and a transfer user interface, such as interface 200, which may be generated by the application server 30, the web server 25 or any other suitable component of the system 10.

At box 304, the system 10 may receive an indication of a bill associated with the transfer request. The bill may be any sort of bill indicating indebtedness between the first party and the second party (e.g., the recipient of the transfer request). For example, the first party and the second party may be roommates, and the bill may be a bill received from one of the parties 65 (e.g., a utility) for the home, apartment, etc., shared by the first party and the second party. According to various embodiments, the bill may be an electronic bill which the first party may or may not have remitted to the billing party. Accordingly, the first party may provide the indication of the bill by selecting it from a list of electronic bills, which may be displayed by the user interface. Also, according to various embodiments, the bill may be a paper bill that has been mailed to the first party. The first party may then provide a textual description of the bill (e.g., an amount, a billing party, etc.), which may be included in the text message described below. In addition to or instead of providing a textual description, the first party may create and upload an electronic copy of the paper bill (e.g., by scanning or otherwise digitizing the paper bill). The bill may also be a contract, or an indication of any other kind of agreement or arrangement between the first party and the second party.

The first party may add a bill to the transfer request, for example, by selecting the Add Bill button 220 from the interface 200. In response, the system 10 may cause the interface 200 to display a list of electronic bills handled by the first party by the financial institution. The first party may then select the bill from the list. If the bill is not an electronic bill, the system 10 may cause the interface 200 to prompt the first party to provide the textual description of the bill and/or generate and provide an electronic copy of the paper bill. It will be appreciated that a single transfer request may, according to various embodiments, include more than one bill.

At box 306, the system 10 may receive a text message associated with the transfer request from the first party. According to various embodiments, the text message may be a series of characters setting forth a message from the first party to the second party. For example, the text message may set forth the reasons for the request and any other background information selected by the first party. According to various embodiments, the text message may indicate a requested amount. Also, according to various embodiments, the first party may cause the system 10 to launch a text editor for entering the text message and/or upload a pre-generated text message by selecting the Messages button 218 from the user interface 200. At box 308, the system 10 may receive from the first party an indication of the second party. If there are recipients of the transfer request other than the second party, these may also be indicated. For example, there may be multiple recipients of the transfer request when the bill is regarding a residence having more than two roommates.

At box 310, the system 10 may receive a requested amount from the first party. If the requested amount is included in the text message, this step may be omitted. The requested amount may represent a share of the bill that is owed by the second party (e.g., some or all of the bill). When there the second party is not the only recipient, each recipient may have an associated requested amount. The requested amounts from different recipients may be the same or different. According to various embodiments, the system 10 may include functionality for calculating a requested amount. For example, the system 10 may receive as input from the first party a number of roommates or other parties among whom the bill will be divided. When the system 10 is not otherwise aware of the amount due on the bill, it may also receive that value from the first party. The amount due on the bill may then be divided among the first party and the second party (and other recipients, if any) according to any suitable method. For example, the amount due may be divided pro rata. Also, according to various embodiments, the amount due may be divided according to pre-determined percentages provided, for example, by the first party. The first party may enter a method for calculating the requested amount or initiate a calculation of a requested amount, for example, by selecting Send $ button 220 from the interface 200.

At box 312, the system 10 may post the transfer request to an account of the second party (and other recipients, if any). Posting the transfer request to an account may involve storing the transfer request to a storage device (e.g., a database 55) corresponding to an account area accessible by the second party or other recipient, for example, as described above. The first party may request that the transfer request be posted by selecting the Post button 224 from the interface 200. The transfer request may be presented to the second party in a manner similar to the way that an electronic bill is presented. The transfer request may comprise the indication of the bill, and the text message. According to various embodiments, the transfer request may also comprise the indication of the requested amount. When an electronic copy of the bill is present, either because the bill is an electronic bill or if an electronic copy of the bill is received from the first party, the transfer request may comprise the electronic copy of the bill. When there is more than one recipient, the system 10 may post the same transfer request to the accounts of all recipients, or may generate separate transfer requests for each recipient. When one or more of the recipients is not a customer of the financial institution implementing the system 10, posting the transfer request may comprise transmitting the transfer request to at least one additional financial institution used by the second party and/or another recipient.

Figure 4:
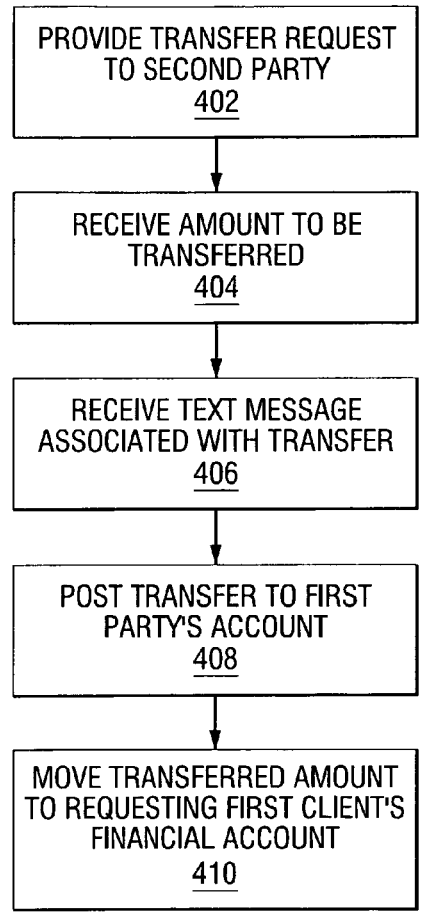
FIG. 4 illustrates one embodiment of a process flow for transferring funds between a first party and a second party.

FIG. 4 illustrates one embodiment of a process flow 400 for transferring funds between a first party and a second party. At box 402, the second party may receive a transfer request, which may have been originated by a first party as described above. The transfer request may comprise an indication of a bill and a text message. As described above, the transfer request may also comprise an electronic copy of a bill and an indication of a requested amount. In various embodiments, the box 402 may be omitted. For example, the second party may initiate a transfer to the first party without having first received a transfer request. In this situation, the second party may provide to the system 10 the indication of the bill and an amount to be transferred, for example, by utilizing Add Bill button 220 and Send $ button 222 from the interface 200. Also, according to various embodiments, the second party may respond to a transfer request by making a transfer to the first party with an amount sufficient to cover the second party's share of the bill indicated in the transfer request as well as one or more additional bills. Indications of these additional bills may be received from the second party.

Referring back to the process flow 400, at box 404 the system 10 may receive from the second party an amount to be transferred. The second party may enter this amount, for example, by selecting the Send $ button 220 from the interface 200. If an indication of a requested amount is present in a transfer request, the amount to be transferred may or may not match the requested amount. For example, the second party may dispute the requested amount, or may simply not have the funds necessary to pay the requested amount. While responding to a transfer request and/or generating a transfer without a transfer request, the second party may view the information window 202 to gain an indication of the funds that the second party has available in his or her various financial accounts.

At box 406, the system 10 may receive a text message associated with the transfer. The text message may include characters conveying any type of message from the second party to the first party. According to various embodiments, the system 10 may launch a text editor, or prompt the second party to upload a pre-generated text message in response to the second party actuating the Messages button 218. At box 408, the system 10 may post a receipt of the transfer to the first party's account. For example, posting the receipt to an account may involve storing the transfer at a storage device corresponding to an account area accessible by the first party. The receipt may comprise an electronic copy of the bill, the amount to be transferred, and the text message provided by the second party. At box 410, the system 10 may transfer the amount to be transferred from a financial account of the second party to a financial account of the first party.

Figure 5:
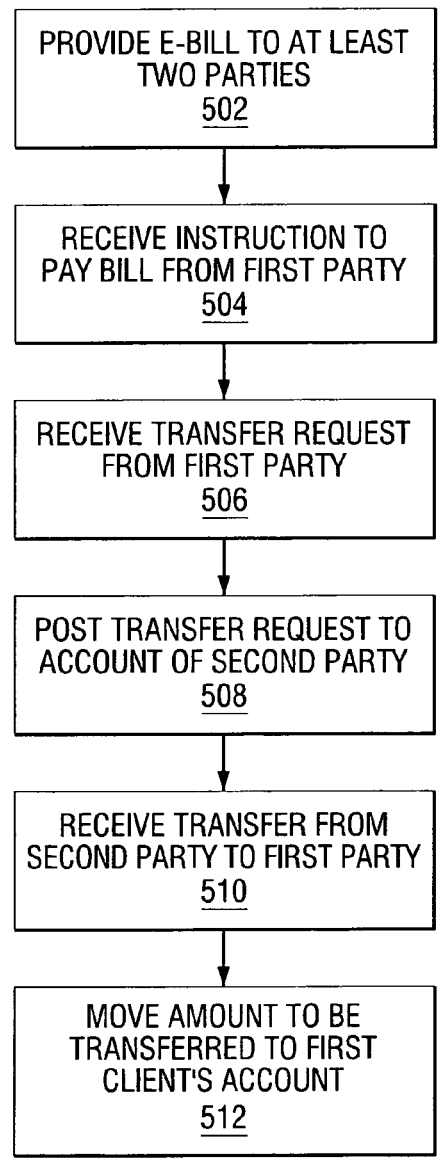
FIG. 5 illustrates one embodiment of a process flow for providing an electronic bill to multiple parties.

FIG. 5 illustrates one embodiment of a process flow 500 for providing an electronic bill to multiple parties. At box 502, an electronic bill may be provided to two or more parties. According to various embodiments, the parties may be customers of the financial institution implementing the system 10, although one or more of the parties may be customers of other financial institutions instead. At box 504, the system 10 may receive an instruction to pay the electronic bill from a first party selected from the parties receiving the electronic bill. The system 10 may then transfer an amount equal to the total due on the bill from a financial account of the first party to the billing party 65. At box 506, the system 10 may receive a transfer request from the first party to one or more recipients including, for example, a second party. The recipients may also be selected from the parties receiving the electronic bill. The transfer request may be posted to the account of the second party, and accounts of other recipients, if any, at box 508. The transfer request may be generated and posted, for example, as set forth above by process flow 300.

At box 510, the second party may direct a transfer to the first party, for example, as described above with respect to process flow 400. The amount to be transferred may then be moved from a financial account of the second party to a financial account of the first party at box 512. The amount transferred may be equal to a requested amount and/or an amount of the bill that is owed by the second party. According to various embodiments, boxes 504, 506 and 508 may be omitted. For example, the second party may initiate a transfer request at box 510 before the first party has paid the bill and/or before the first party has made a transfer request.

Figure 6:
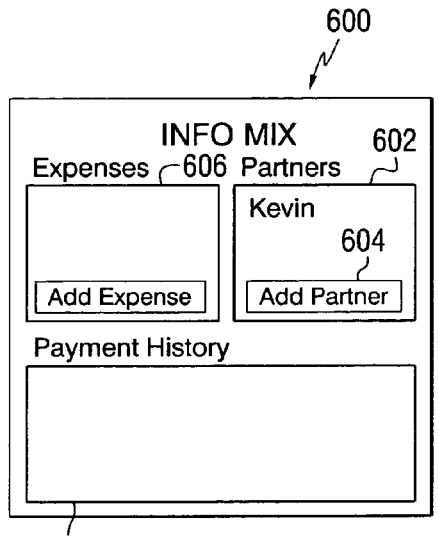
FIG. 6 illustrates one embodiment of a user interface for managing bills and other expenses shared between parties, such as roommates.

FIG. 6 illustrates one embodiment of a user interface for managing bills and other expenses shared between parties, such as roommates. The interface 600 may be implemented by the system 10 and, for example, by the application server 60. The interface 600 may comprise a Partners field 602, which may list various parties, or partners, sharing expenses. The interface 600 may also include an Expenses field 606 showing a listing of shared expenses and a Payment History field 618 showing a listing of various payments associated with the expenses including, for example, payments to billing parties 65, amounts paid by various parties, transfer requests, etc.

The interface 600 may be provided to all of the parties, however, some features (e.g., adding and subtracting bills, adding and subtracting parties, etc.), may not be available to all parties. The interface may be initiated by one party, referred to as an originating party. The originating party may then invite their roommates or other individuals with whom they share expenses to become parties according to any suitable method. For example, the originating party or other user may select the add partner button 604. This may cause the user interface 600 to prompt the originating party or other party to identify a potential party. The potential party may then be provided with a communication inviting them to become a party. The communication may take various forms. For example, the communication may be an e-mail sent to a personal e-mail account of the potential party. The communication may also be an e-mail sent to an account of the potential party associated with the financial institution (e.g., implemented by e-mail server 60), or any other suitable message type provided to the potential party by the financial institution. This communication may include a link to the interface 600. When the originating party and the potential party are not customers of the same financial institution (e.g., the financial institution implementing the user interface 600), then the communication may include in invitation for the potential party to open an account with the originating party's financial institution. Some embodiments, however, do not require a potential party to have an account with the financial institution implementing the interface 600.

Figure 7:
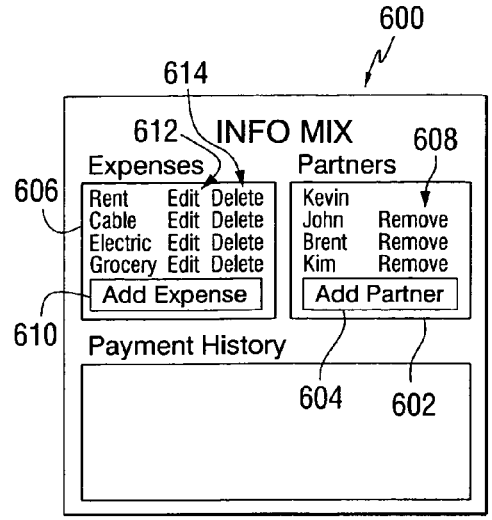
FIG. 7 illustrates one embodiment of the user interface of FIG. 6 with additional partners listed at a Partners field.

FIG. 7 illustrates one embodiment of the user interface 600 with additional parties, or partners, listed at Partners field 602. Each additional party may have a Remove button positioned next to their name. Selecting the Remove button next to a party's name may cause the partner to be removed from the Partners field 602 and from consideration by the interface 600 for payment of shared expenses. This may allow a party to be removed from consideration for shared expenses, for example, when his or her liability for shared expenses ceases. For example, when a roommate moves out, he or she may be removed as a party.

Figure 8:
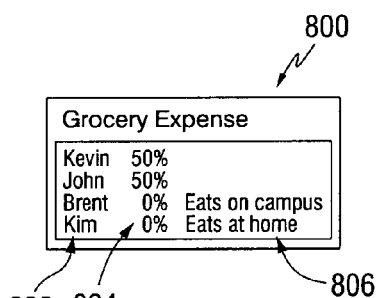
FIG. 8 illustrates one embodiment of a screen of the user interface of FIG. 6 that may be presented to an originating partner or other user allowing them to enter and/or modify the terms of a shared expense.

Referring now to the Expenses field 606, new expenses may be added, for example, by selecting the Add Expense button 610. Each expense listed at field 606 may have an associated Edit button 612 and Delete button 614. FIG. 8 illustrates one embodiment of a screen 800 of the user interface 600 that may be presented to an originating party or other user allowing them to enter and/or modify the terms of a shared expense. For example, the screen 800 may be shown when the Add Expense button 610 and/or one of the Edit buttons 612 is selected. As shown in FIG. 8, the screen 800 relates to grocery expenses. Partners field 802 may list each party. A percentage field 804 may list a portion of the shared expense owed by each party. A comment field 806 may allow comments regarding each party's obligation to be entered. In some embodiments, the screen 800 may default to a pro rata distribution of the expense. For example, the embodiment shown in FIG. 8 includes four parties, so a default distribution may have 25% of the expense attributed to each party. The originating party, or other user, however, may be able to change the distribution of the expense for various reasons. For example, as illustrated in FIG. 8, a grocery expense is split between two parties, while the other two parties pay none of that expense. The reason for this distribution is entered at comment field 806. In some embodiments, parties who do not have responsibility for an expense may not be listed at Partners field 802.

Expenses may paid from the parties' financial accounts according to any suitable method. For example, a party selected from the group may be responsible for each expense (e.g., the expense may be ultimately paid from the financial account of the responsible party). Other parties sharing a given expense may transfer funds to the financial account of the responsible party to cover their responsibility. The responsible party may be the originating party or any other party selected from the group. According to various embodiments, different parties may be responsible for different expenses. In some embodiments, the financial institution may set up an account shared by all of the parties. Expenses may be paid from the shared financial account, and all parties sharing a given expense may transfer funds to the shared financial account to cover their share.

Figure 9:
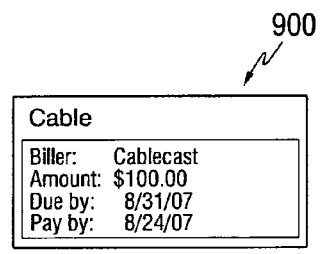
FIG. 9 illustrates one embodiment of a screen of the user interface of FIG. 6 showing a posting of an expense.
Figure 10:
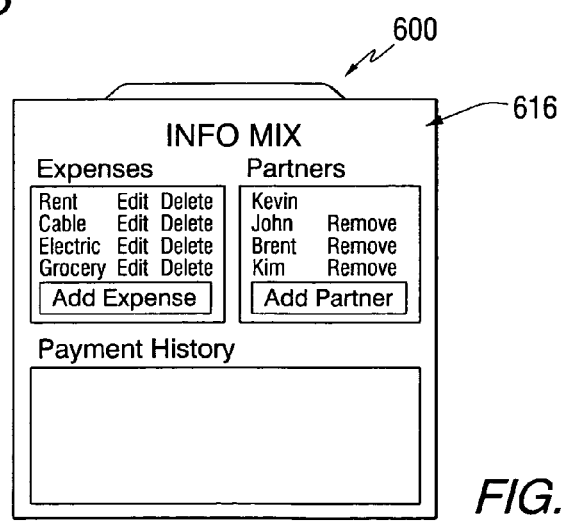
FIG. 10 illustrates one embodiment of the user interface of FIG. 6 including an indication that a transfer request has been received.

When an expense is received, it may be posted to the user interface 600. An expense may be received, for example, when it is accrued and/or when a bill for the expense is received. Expenses may be posted according to any suitable manner. For example, the responsible partner may manually post an expense. Also, for example, an expense may be posted automatically (e.g., after an electronic bill is received for the expense, and/or according to a periodic schedule). Once an expense is posted to the interface 600, it may be shown at Payment History field 618. Also, FIG. 9 illustrates one embodiment of a screen 900 of the user interface 600 showing a posting of an expense. The screen 900 may include information about the expense including, for example, a billing party 65, an amount of the expense, a due date, and a target pay date. The responsible party may prepare transfer requests to the other parties, or the transfer request may be generated automatically. FIG. 10 illustrates one embodiment of the user interface 600 having an indication 616 that a transfer request has been received. This view may be shown to parties from whom a transfer is requested.

Figure 11A:
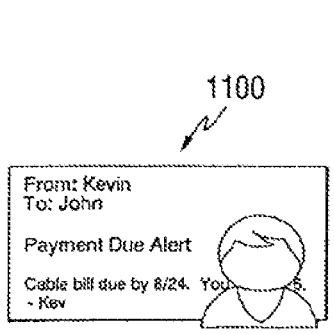
FIG. 11A illustrates one embodiment of a transfer request e-mail.

A transfer request may be accessed by the parties according to any suitable method. For example, a transfer request may be communicated to the parties as an e-mail. FIG. 11A illustrates one embodiment of a transfer request e-mail 1100. The e-mail may include a text message as well as other components including, for example, a requested amount, a due date, etc. The party may complete the requested transfer according to any suitable method including, for example, by replying to the e-mail. FIG. 11C illustrates one embodiment of a transfer request mobile phone message 1102. The message 1102 may be similar to the e-mail 1100, but may be formatted to be received on a mobile phone (e.g., Short Message Service (SMS) format). Again, the party may complete the requested transfer according to any suitable method including, for example, by replying to the message 1102.

Figure 11B:
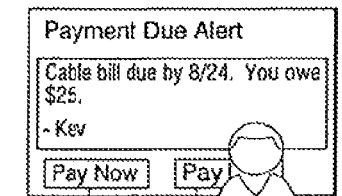
FIG. 11B illustrates one embodiment of a transfer request implemented as an interactive screen of the user interface of FIG. 6.
Figure 11C:
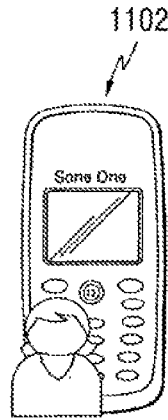
FIG. 11C illustrates one embodiment of a transfer request mobile phone message.
Figure 12:
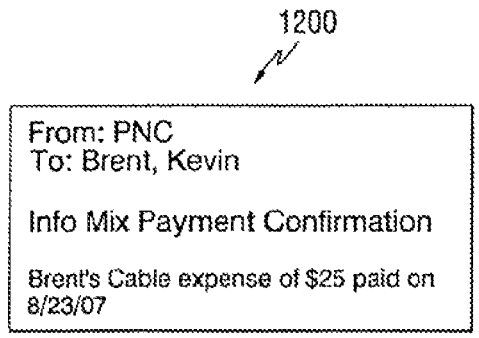
FIG. 12 illustrates one embodiment of a payment confirmation message that may be provided to a partner after they have transferred funds to cover an expense.
Figure 13:
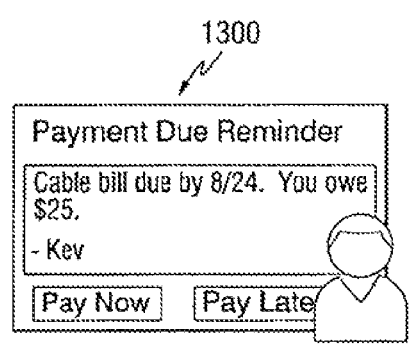
FIG. 13 illustrates one embodiment of a Payment Due Reminder screen of the user interface of FIG. 6.
Figure 14:
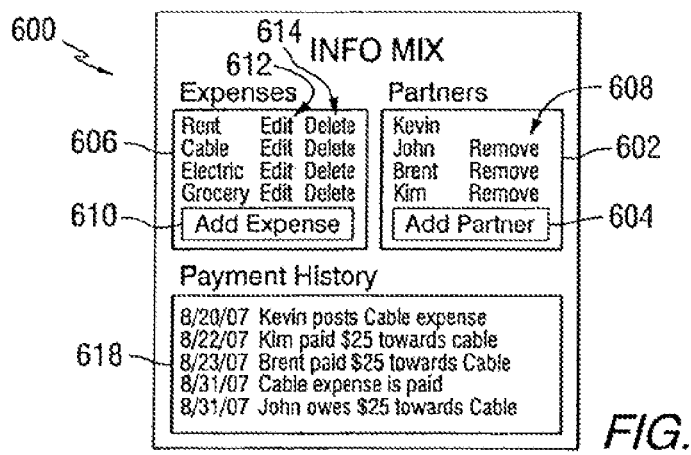
FIG. 14 illustrates one embodiment of the user interface of FIG. 6 indicating that a cable expense has been paid.

FIG. 11B illustrates one embodiment of a transfer request implemented as an interactive screen 1104 of the user interface 600. The screen 1104 may include information similar to that of message 1102 and e-mail 1100. The screen 1104 may also include functionality for completing the requested transfer. According to various embodiments, the parties may log into interface 600 to access the user screen 1104 after receiving an e-mail 1100 or message 1102. The screen 1104 may include a Pay Now button 1106. Selecting this button may allow a party to make the requested transfer. A Pay Later button 1108 may allow the party to schedule the requested transfer at some point in the future (e.g., after a payday). The payment of a transfer request may also be posted to the Payment History field 618. Making a requested transfer may involve transferring the requested amount from a financial account of the payor to a financial account of the payee. After completing a requested transfer, a party may receive a payment confirmation. FIG. 12 illustrates one embodiment of a payment confirmation message 1200 that may be provided to a party after they have transferred funds to cover an expense. The message 1200 may be provided to a party according to any suitable method including, for example, via e-mail and/or via the interface 600.

Where the expense is an electronic bill from a billing party 65, it may be automatically paid upon receipt of all requested transfers from the parties. According to various embodiments, the expense may also be automatically paid at a predetermined time on or in advance of a due date for the expense regardless of whether all requested transfers have been received by the responsible partner. Once an expense is paid, it may be marked as being paid at the Payment History field 618. FIG. 14 illustrates one embodiment of the user interface 600 indicating that a cable expense has been paid. If an expense is paid before all of the requested transfers are received, parties who have not yet made the requested payment may receive a reminder. FIG. 13 illustrates one embodiment of a Payment Due Reminder screen 1300 of the user interface 600. In some embodiments, the sending of the reminder may be posted to the Payment History field 618, as shown in FIG. 14.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semipermanent and/or semi-temporary.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention.

We claim:

1. A computer-implemented method of administering expense sharing between parties, the method comprising:
   receiving, by a computer, from a first party a request to implement an expense sharing interface, wherein the computer comprises at least one processor and operatively associated memory;
   receiving, by the computer, from the first party an indication of a potential second party;
   sending, by the computer, a communication to the potential second party, wherein the communication comprises an invitation to join the expense sharing interface;
   receiving, by the computer, a description of at least one expense from one of the first party and the second party;
   posting, by the computer, a first expense to the expense sharing interface, wherein the expense sharing interface is accessible to the first party and the second party;
   determining, by the computer, an amount of the first expense attributable to the first party and an amount of the first expense attributable to the second party;

sending, by the computer, a transfer request to the second party, wherein the transfer request requests that the second party transfer the amount of the first expense attributable to the second party; and paying, by the computer, the first expense from a financial account of the first party, wherein the paying of the first expense occurs automatically by a predetermined date regardless of whether the amount attributable to the second party is received to the financial account of the first party.

2. The method of claim 1, wherein the description of the expense comprises an indication of a first portion of the expense attributable to the first party and an indication of a second portion of the expense attributable to the second party.

3. The method of claim 1, further comprising transferring the amount attributable to the second party from a financial account of the second party to the financial account of the first party.

4. The method of claim 3, wherein the paying of the first expense occurs automatically when the amount attributable to the second party is received to the financial account of the first party.

5. The method of claim 1, wherein determining the amount of the first expense attributable to the first party and the amount of the first expense attributable to the second party comprises calculating a pro-rata distribution of the first expense.

6. The method of claim 1, wherein determining the amount of the first expense attributable to the first party and the amount of the first expense attributable to the second party comprises calculating a predetermined distribution of the first expense, wherein the predetermined distribution is received from at least one of the first party and the second party.

7. The method of claim 1, wherein the invitation to join the expense sharing interface comprises an invitation to open an account at a financial institution implementing the expense sharing interface.

8. A system for administering expense sharing between parties, the system comprising: at least one computer device comprising at least one processor and operatively associated memory, the memory comprising instructions that, when executed by the at least one processor, cause the at least one computer device to:

receive from a first party a request to implement an expense sharing interface;

receive from the first party an indication of a potential second party;

send a communication to the potential second party, wherein the communication comprises an invitation to join the expense sharing interface;

receive a description of at least one expense from one of the first party and the second party;

post a first expense to the expense sharing interface, wherein the expense sharing interface is accessible to the first party and the second party;

determine an amount of the first expense attributable to the first party and an amount of the first expense attributable to the second party;

send a transfer request to the second party, wherein the transfer request requests that the second party transfer the amount of the first expense attributable to the second party; and pay the first expense from a financial account of the first party, wherein the paying of the first expense occurs automatically by a predetermined date regardless of whether the amount attributable to the second party is received to the financial account of the first party.

9. A computer readable storage medium having instructions thereon that, when executed by at least one processor, cause the at least one processor to:

receive from a first party a request to implement an expense sharing interface;

receive from the first party an indication of a potential second party;

send a communication to the potential second party, wherein the communication comprises an invitation to join the expense sharing interface;

receive a description of at least one expense from one of the first party and the second party;

post a first expense to the expense sharing interface, wherein the expense sharing interface is accessible to the first party and the second party;

determine an amount of the first expense attributable to the first party and an amount of the first expense attributable to the second party;

send a transfer request to the second party, wherein the transfer request requests that the second party transfer the amount of the first expense attributable to the second party; and pay the first expense from a financial account of the first party, wherein the paying of the first expense occurs automatically by a predetermined date regardless of whether the amount attributable to the second party is received to the financial account of the first party.

* * * * *